Figure 1:
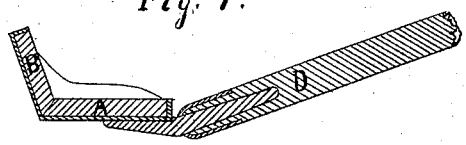

(No Model.)

G. F. PEASE.
DENTIST'S MOUTH MIRROR.

No. 415,788. Patented Nov. 26, 1889.

Witnesses:
Francis W. Rice.
Chas. A. Maynard

Inventor.
Geo. F. Pease

UNITED STATES PATENT OFFICE.

GEORGE F. PEASE, OF SPRINGFIELD, MASSACHUSETTS.

DENTIST'S MOUTH-MIRROR.

SPECIFICATION forming part of Letters Patent No. 415,788, dated November 26, 1889.

Application filed May 28, 1889. Serial No. 312,469. (No model.)

*To all whom it may concern:*

Be it known that I, GEORGE F. PEASE, a citizen of the United States, residing at Springfield, in the county of Hampden and State of Massachusetts, have invented a new and useful Improvement in Dentists' Mouth-Mirrors; and I do hereby declare that the following is a full, clear, and exact description of the invention, reference being had to the accompanying drawings, and to the letters of reference marked thereon, making a part of this specification.

Heretofore dentists' mouth-mirrors have consisted of a simple plain or concave spherical mirror, which, when placed in the mouth, is soon covered with the condensed moisture from the breath, necessitating constant cleaning by the operator. This difficulty is fully obviated by the addition of the back B and sides C, as shown in the drawings, thereby deflecting the breath from the mirror A.

The next feature of my invention consists in having duplex mirrors, the mirror A to work from, and the mirror B to concentrate the rays of light upon the tooth or cavity, enabling the operator to see the work much more distinctly than with the mirror heretofore used.

Figure 2:
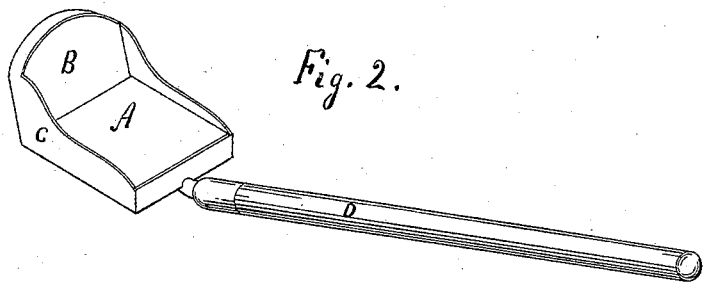

Referring to the accompanying drawings, Figure 1 is a sectional, and Fig. 2 is a perspective, view of my device, in which A and B are mirrors, C the metallic sides, and D the handle.

In construction my device consists of a suitable frame of metal, with metal sides C and mirrors A and B and handle D. The mirrors A and B can be either plain or concave; but I prefer to have the working mirror A plain and the mirror B concave, thereby concentrating the rays of light upon the tooth or cavity.

Having fully described my invention, what I desire to claim and secure by Letters Patent is—

The dentist's mouth-mirror herein shown and described, the same consisting of the mirror A, back B, and sides C, whereby the moisture from the breath is prevented from condensing upon the mirror A, substantially as and for the purpose set forth.

GEO. F. PEASE.

Witnesses:
CHAS. A. MAYNARD,
CHAS. H. MAYNARD.